Feb. 22, 1955  E. DOMINGO  2,702,767
METHOD AND APPARATUS FOR CLEANSING MILKING MACHINES
Filed Oct. 9, 1950
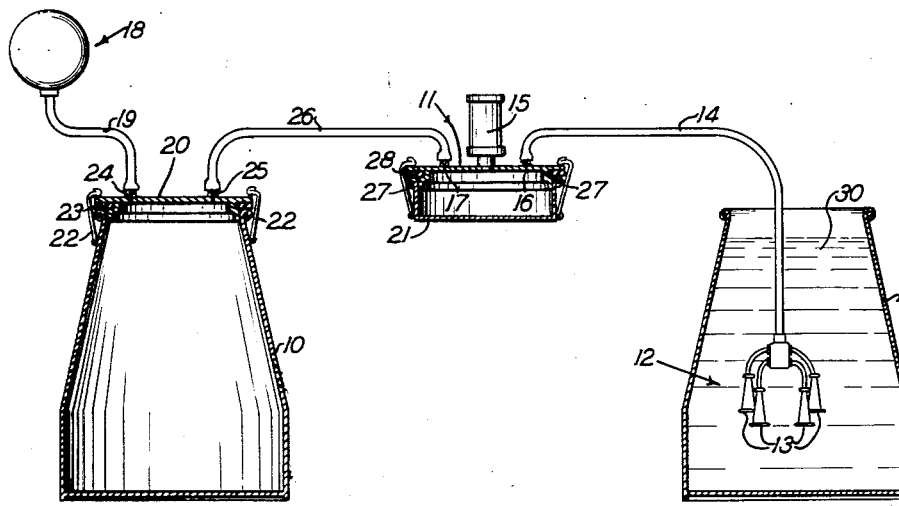
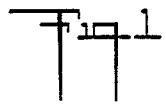
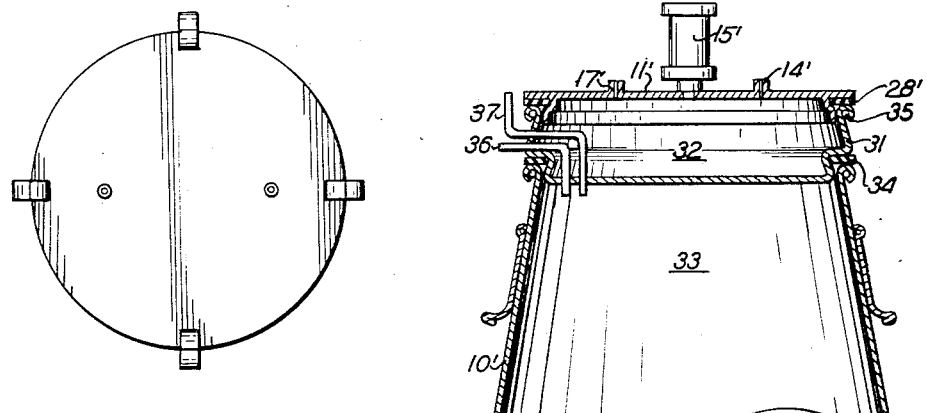
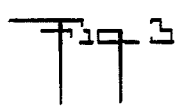
INVENTOR
EMIL DOMINGO
BY *George H. Mitchell, Jr.*

United States Patent Office 2,702,767
Patented Feb. 22, 1955

2,702,767

METHOD AND APPARATUS FOR CLEANSING MILKING MACHINES

Emil Domingo, New York, N. Y.

Application October 9, 1950, Serial No. 189,196

10 Claims. (Cl. 134—22)

This invention relates to dairying, and more particularly to a method for cleansing apparatus used for milking, as well as apparatus which may be used in the application of the method.

Apparatus used in the handling of milk at any stage, from the point at which it is dispensed by the cow until it reaches the ultimate consumer, must be maintained with scrupulous cleanliness. The present disclosure is primarily concerned with milking machines used at the source of supply, but it will be obvious that ideas unfolded in this connection may be applied to procedures and apparatus used in the handling of milk at other points.

A characteristic of milking machines with which this invention is concerned is that they provide a container, or pail, having a cover associated therewith, into which the milk is first delivered as received from a cow. The capacity of the container is such that the milk from several cows may be received, but in any event it is customary to empty the container into some larger container before it is filled to the top with milk. For this reason, less regard has been given to the cleanliness of the cover of the milking machine on the assumption that the milk does not come in contact with it. But experience shows that in carrying a partially filled milking machine to the place where it is to be emptied a certain amount of the milk contained therein will be "sloshed about" on the inner surface of the cover.

Milking machines of this general type usually have the operating connections, and actuating apparatus, associated with the cover for convenience. These include an inlet opening for milk received from a milker claw with its associated teat-cups, and a pulsator, or other apparatus to induce this milk to flow.

There is also associated with the cover usually, means to maintain the interior of the container, or receptacle, under reduced pressure so as to induce the milk to flow into the container. Very often the cover is provided with means for connecting the interior of the pail with a source of vacuum, this vacuum also being utilized ot operate the pulsator. However, the pulsator may be operated by other means, such as by electrical means.

In order fully to safeguard the cleanliness of milking machines of the general type under discussion it is essential that, not only the pail, but the inner surface of the cover and all the surfaces with which the milk may come in contact be maintained free from contamination. One way of doing this is to flush these surfaces with an appropriate cleansing solution. The problem presented is one of insuring that this solution reach all such surfaces. It is not practical simply to place the cleansing fluid in the machine and agitate it, or up-end it, as the operating mechanism might thereby be damaged.

Broadly, the present method contemplates using a source of vacuum, which may already be available for the normal operation of the milk handling apparatus, to draw through the apparatus a cleansing solution so that the solution will encounter all of the surface area with which the milk would come in contact and, in addition include areas adjacent the inlet portion of the handling system, such as the surfaces surrounding the openings in the teat cups.

The method also contemplates the use of a vacuum source to draw cleansing solution through a closed fluid system, this system including within its closed circuit surfaces areas of the apparatus to be cleansed.

The method is also applicable to the cleansing of a number of units of apparatus of substantially similar capacity, where it is convenient to allow a cleansing solution to pass through the apparatus. By employing the present method, it is possible to easily measure an appropriate quantity of solution sufficient to cleanse one unit of apparatus, and if a source of vacuum is used, to draw this solution through the apparatus without danger of its passing over into the vacuum apparatus, whereupon the cycle may be repeated upon successive units until the cleansing solution becomes unusable. This desireable result is accomplished by using one of the units to be cleansed as a measure, as by filling one of the containers nearly to capacity. Inasmuch as all the other units are of substantially similar construction, when the solution is drawn from the unit employed as a measure into another unit, the capacity of the second unit cannot be exceeded, and there is no chance for the solution to pass over into the vacuum line.

Furthermore, when this multiple cycle method is used, it is immaterial as to amount of ancillary apparatus included in each cycle of operation. It is preferable to include the milker claw and the cover, with its associated mechanism including the milk line to the claw, in the closed circuit with the container portion of the milking machine in each cycle, but regardless of whether all of these elements are included, or not, the amount of cleansing fluid required can be easily determined by the capacity of one of the containers, and being thus determined it will be automatically prevented from entering the source of vacuum after it has passed through the circuit.

Broadly stated, the apparatus disclosed in this invention facilitates the creation of a closed fluid circuit for the cleansing solution to come in contact with all the portions of the apparatus to be treated. In addition, it makes possible the cleansing of portions of the apparatus which were previously ignored, or overlooked, by the methods or apparatus employed; or, if not ignored, were only cleansed with difficulty.

The present apparatus makes it possible to subdivide what is normally a single receptacle into at least two closed vessels, the purpose of this arrangement being to form a relatively shallow vessel, in conjunction with the usual cover portion, so that this small-capacity vessel may be completely filled with cleansing fluid without the use of an excessive amount of fluid, which would be necessary if sub-compartmentation were not done. The provision of a closed vessel, in conjunction with the inner surface of the cover, also insures contact between the fluid and the surface of the cover to be cleansed, and makes it possible to pass fluid over this surface by means of differential pressure.

A further advantage of this apparatus, in the formation of a closed vessel in conjunction with the cover portion, and another closed vessel in conjunction with the container portion, is in the provision of a serially connected closed circuit for the cleansing solution, permitting it to perform its function with respect to the inner surface of the cover and the container portion, with additional elements of the apparatus included in the fluid circuit as desired.

Other advantages, and applications of the method and apparatus which lie within the scope of this invention will be apparent after studying the following description, together with the accompanying drawing, in which:

Fig. 1 is a cross-sectional elevation of a preferred form of apparatus, as applied to one type of milking machine, for accomplishing the method of this invention; Fig. 2 is an enlarged plan view of the apparatus as applied to a container portion of the milking machine of Fig. 1; and Fig. 3 is a cross-sectional elevation of a modified form of apparatus.

In Fig. 1 of the drawing there is shown a conventional milking machine provided with a container 10, a cover 11, and a milker claw 12. The milker claw is provided with the usual teat cups 13, and is joined to the cover by a flexible milk line 14. The cover may also include a conventional pulsator 15 for actuating the teat cups in the usual way. A port 17 in the cover is adapted for connection with a source of vacuum, indicated generally at 18, by means of suitable conduits, while milk enters the container through the port 16, which is adapted for connection with the milk line 14, under the influence of reduced pressure in the container. As shown in the drawing, the machine is disassembled for cleansing purposes, but when used for milking the flexible tube 19, leading from the vacuum source 18, would be connected directly to port 17 in the cover 11. This arrangement is well known in the art, and a detailed description of operation is not deemed necessary.

For accomplishing the method herein disclosed, apparatus is provided which enables the division of the milking machine into two compartments, one of which is of relatively small volume, and permits the application of a quantity of the cleansing fluid to the entire inner surface of the cover of the milking machine as well as to all of the conduit surfaces from the teat cups to the interior of the container with which milk may come in contact.

One form of apparatus may include an auxiliary cover 20, and an auxiliary container or pail 21. The dimensions of the cover 20 should be such that it may be substituted with the container 10 in place of the usual cover 11, and secured by the usual fasteners 22, so as to form with container 10 an airtight closed vessel. This auxiliary cover may be provided with a gasket 23 if desired. Means is also provided in connection with the auxiliary cover to permit the closed vessel thus formed to be placed in communication with a source of vacuum, and to permit cleansing fluid to be admitted to its interior. One way of doing this is to provide the ports 24 and 25, one of said ports being adapted for connection to the conduit 19, leading to the vacuum source 18, the other of said ports being adapted for connection to a conduit 26, which is in turn adapted to be connected to port 17 in the cover 11, for a purpose which will be explained.

The auxiliary container 21 is adapted to be attached to the cover 11 in substitution for the usual container 10, and may be provided with fastener means 27 for airtight engagement with the cover gasket 28.

With the auxiliary cover and container attached as just described, and shown in Fig. 1, the performance of the method may now be carried out. A vessel 29 is provided with suitable cleansing fluid, indicated at 30. The composition of this fluid is well known in dairying, and forms no part of the invention. The milker claw 12, being submerged in the fluid 30, and the source of vacuum 18 being in operation, a partial vacuum will be created within the closed vessel formed by container 10 and auxiliary cover 20, and by virtue of the communicating line 26 a partial vacuum will also be created within the closed vessel formed by cover 11 and auxiliary container 21. As a result the pulsator 15 will operate as though performing the milking function, causing a flow of cleansing fluid 30 in the milk line 14. The partial vacuum being maintained in the system, cleansing fluid will enter the container 21, having traversed from the teat cups 13 all of the passages which milk would traverse during the usual milking operation. Further operation will cause the vessel which includes the cover 11 to become entirely filled with fluid which has been withdrawn from the vessel 29. When all of the air has been withdrawn from the vessel of which cover 11 forms a part, continued operation of the vacuum source 18 will cause a flow of fluid into line 26 into the milking machine container 10. During this phase of operation, there being no air in the vessel which includes cover 11, the entire inner surface of this vessel will be filled with cleansing fluid, and all the surfaces of the cover 11, and its attendant apparatus 15, which might come in contact with milk in the course of the milking process will therefore be thoroughly cleansed. Likewise, as long as the partial vacuum is maintained within the vessel which includes the container 10, and sufficient fluid enters the conduit 26, the interior of container 10 will receive increasing amounts of the fluid until it is filled, and therefore cleansed.

A refinement of the method described is particularly useful where a number of similar milking machines, having substantially identical capacity, are to be cleansed. This comprises the use of one of the containers 10 of a series of substantially identical units as the vessel indicated at 29 in Fig. 1 into which the cleansing fluid is initially placed before the cleansing operation begins. By this method, it is not necessary to provide a special measurement means to determine the quantity of fluid to be used. All that is needed is to fill the vessel 29 nearly to capacity. Inasmuch as all of the containers will be of similar capacity, there will be no danger of fluid overflowing the container 10 and entering the vacuum line 19, even if the vacuum source continues to operate after all the fluid has been removed from the vessel 29. Even if the identical container 29 is filled to the top, a certain amount of the fluid will remain in the auxiliary container 21, which may be emptied into container 10, when the auxiliary cover 20 has been removed. The container 10 thus becomes the vessel from which the fluid is to be drawn in cleansing the next milking machine of an identical series. This substitution of containers may be continued until all of the machines have been subjected to the process.

A modified form of apparatus is shown in Fig. 3 of the drawing, in which there is provided the usual container of a milking machine 10' having a cover 11', pulsator 15', and milk line 14' leading to a milker claw (not shown). In this case an element 31 is interposed between the cover 11' and container 10' which is effective to create two airtight closed vessels 32 and 33, one of which includes the container 10' and the other the cover 11'. The element 31 as shown comprises a shallow pan, provided with a lower annular portion which includes a gasket 34 adapted to seat on the upper rim of container 10', and an upwardly extending annular ridge 35 upon which the gasket 28' of the cover may be seated. Essentially, the element 31 might include simply a flexible membrane, which would be capable of supporting a body of fluid in contact with the under surface of the cover 11'. In addition, a conduit 36 for connection with the source of vacuum 18, and a conduit 37, adapted to be connected to port 17' of the cover, are provided in association with the element 31; these conduits being adapted to establish communication between the interior of the vessel 33, and the vacuum source 18, and the top of vessel 32, respectively.

The operation of the method, using the modified form of apparatus is similar to operation with the apparatus first described, the cleansing fluid being drawn by suction through the line 14', into vessel 32, and when that has been filled so that the underside of cover 11' is entirely wetted by the fluid, into conduit 37 and thence into vessel 33, formed by container 10'; this operation depending upon the creation of a partial vacuum in container 33 which is in communication with the source of vacuum via the conduit 36.

It will thus be seen that there has been provided a simple method by which the cleansing of milking machines may be accomplished. Not the least of the benefits of this method is the especially thorough cleansing of the milker claw and associated apparatus by virtue of its being initially submerged in the fluid. The fluid being drawn through the entire apparatus, follows the course normally taken by the milk thus every surface into which milk comes in contact will be attacked by the cleansing fluid.

I claim:

1. Method of cleansing the cover of a milking machine provided with a pulsator attached to said cover, including the steps of providing a substantially rigid surface having a continuous margin which defines the area of the cover to be cleaned, placing the margin of said surface in contact with the cover to form a closed chamber of minimum volume, closing the opening of a milker pail to provide a liquid trap, placing the inlet of said cover in communication with a body of cleansing solution, and placing the outlet of said cover in communication with a source of vacuum through said liquid trap to draw into and completely fill the vessel thus formed by the cover and the rigid surface, said cover being maintained in a horizontal position with the pulsator uppermost to minimize admission of said solution into said pulsator.

2. Method of cleansing the cover and milker claw of a milking machine, including the steps of providing a substantially rigid surface complementary to the surface of the cover to be cleansed, combining the surface and the cover to form a closed vessel of minimum volume, placing the inlet openings of the milker claw in communication with a body of cleansing fluid, forming a closed fluid circuit including said vessel and said milker claw, and placing the interior of said vessel under the influence of a source of vacuum via a closed milker pail arranged to act as a liquid trap to draw the cleansing fluid through said milker claw into said vessel to fill said vessel to capacity to cleanse the area of the cover defined by said complementary surface by immersion in said cleansing fluid.

3. Method of cleansing a milking machine having a pail, a removable cover, and a milker claw, including the steps of removing the cover from the pail, providing a surface complementary to the opening thus provided in the pail to form with said pail a first closed vessel, providing a second surface complementary to the area of the cover to be cleansed to form with said area a second closed vessel of minimum volume, placing the inlets of the milker claw in communication with a body of cleansing solution of less volume than that of said first closed vessel, forming a closed fluid circuit serially including said vessels and said milker claw, and placing the interior of said first vessel in communication with a source of vacuum to draw cleansing solution first into the interior of said second vessel through said milker claw thence into the interior of the first vessel from said second vessel.

4. Method of cleansing a milking machine having a pail and a removable cover, said cover being normally provided with an orifice for the transfer of milk into the pail and an orifice for communication with a source of vacuum, including the steps of removing the cover from the pail, providing a surface which will form a first closed vessel when combined with said pail, providing a second surface which will form a second closed vessel when combined with said cover, combining said surfaces with the pail and the cover to form said closed vessels, placing one of the orifices of said cover in communication with a quantity of cleansing solution substantially equal to that of said first closed vessel, placing the interior of said first vessel in communication with the other of the orifices of said cover, and placing the interior of said first vessel in communication with a source of vacuum to draw cleansing solution through said second vessel into the interior of the first vessel.

5. Method of cleansing a plurality of machines having substantially identical volumetric capacity, said machines being provided with pails and removable covers, and said covers having orifices for connection with a source of milk and a source of vacuum, including the steps of filling the pail of any one of said machines to capacity with cleansing solution, providing a relatively shallow closed first vessel whose interior includes the cover of another of said machines, providing a second closed vessel which includes the pail of said other machine, establishing a closed fluid circuit including serially said first and second vessels between a source of vacuum and said cleansing solution, said fluid circuit including the orifices of the cover forming said first closed vessel, to enable said cleansing solution to be drawn from said pail of one machine to the pail of said other machine while cleansing the essential portions of said other machine, any one of said pails comprising a volumetric measuring device for said solution whereby said flow of cleansing solution into the second of said closed vessels will cease automatically before entering the vacuum source.

6. Method of cleansing a plurality of milking machines having substantially equal liquid capacity, each of said machines comprising a pail, a removable cover, a milker claw, a flexible conduit for connection between the cover and the milker claw, and means on the cover for connection to a source of vacuum normally to place the interior of the milking machine under reduced pressure, including the steps of filling the pail of any one of the milking machines to capacity with cleansing solution, forming with the cover of another milking machine a relatively shallow closed vessel, forming with the pail of another milking machine a second closed vessel, establishing communication between the interior of said second closed vessel and a source of reduced pressure, placing the inlet of the milker claw in communication with the cleansing solution in said pail of the one machine, establishing communication between the connection means on the cover of said other machine and the interior of said second closed vessel, to enable the cleansing solution to be drawn serially through said milker claw and cover of said other milking machine into the pail of said other milking machine, any one of said pails providing a volumetric measurement of the quantity of cleansing solution to be used whereby said cleansing solution is automatically prevented from entering the source of vacuum.

7. In apparatus for cleansing vacuum-operated milking machines having a pail and a removable cover which normally cooperate to form a sealed single receptacle for milk received from a cow, said cover being provided with a vacuum connection, the combination including means to form two closed compartments from the receptacle and removable cover defined by the line of demarcation between the pail and cover, one of the compartments including the pail the other compartment including the cover, conduit means to establish communication between said compartments, and means to establish a vacuum therein.

8. In apparatus for cleansing vacuum-operated milking machines having a separable cover and pail normally joined to form a single receptacle for milk received from a cow, the cover being provided with connections for a milk conduit and a vacuum conduit, the combination including, substantially rigid wall means to form with the cover and pail two compartments defined by the line of separation between the cover and pail, the compartment formed with the cover being relatively shallow, conduit means for establishing communication between the interior of the compartment formed with the pail and one of the connections provided with the cover, and means to establish communication between the compartment formed with the pail and a source of vacuum.

9. In apparatus for cleansing vacuum-operated milking machines having a separable cover and pail normally joined to form a single receptacle for milk received from a cow, the cover having connections for a milk line and a vacuum line, the combination including a shallow pan adapted for engagement with the cover, an auxiliary cover adapted for engagement with the pail, conduit means for engagement with one of the connections on the cover, and orifice means on the auxiliary cover to establish communication between the pail interior and both the vacuum line and said conduit means.

10. In apparatus for cleansing vacuum-operated milking machines having a separable cover means and container means, said cover means including inlet conduit means associated with a milker claw means and coupling means for association with a vacuum line, the combination including an auxiliary cover adapted to be substituted with said pail means in place of said cover means, an auxiliary pail of relatively small volumetric capacity adapted to be substituted with said cover means in place of said pail means, and a flexible conduit, said auxiliary cover being provided with a pair of openings having couplings thereon, said flexible conduit being adapted to be connected between the vacuum line coupling of said cover means and one of the couplings of the auxiliary cover, the other of the auxiliary cover couplings being adapted to be connected to a vacuum line.

References Cited in the file of this patent
UNITED STATES PATENTS

| | | |
|---|---|---|
| 1,328,657 | Fish | Jan. 20, 1920 |
| 1,613,185 | Mitchell | Jan. 4, 1927 |
| 2,067,922 | Hothersall | Jan. 9, 1937 |
| 2,196,846 | Andrus | Apr. 9, 1940 |
| 2,292,849 | Schmitt | Aug. 11, 1942 |